(12) United States Patent
Piercy et al.

(10) Patent No.: US 8,027,454 B1
(45) Date of Patent: Sep. 27, 2011

(54) TRUNK SPARING

(75) Inventors: Larry H. Piercy, St. Joseph, MO (US); Trey A. Hilyard, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1025 days.

(21) Appl. No.: 11/867,458

(22) Filed: Oct. 4, 2007

(51) Int. Cl.
*H04M 7/00* (2006.01)

(52) U.S. Cl. ........ 379/234; 379/232; 379/243; 370/340; 370/341; 370/327

(58) Field of Classification Search .................. 379/234, 379/232, 243; 370/340, 341, 327
See application file for complete search history.

(56) References Cited

U.S. PATENT DOCUMENTS

| | | | |
|---|---|---|---|
| 5,101,451 A * | 3/1992 | Ash et al. ................. | 379/221.07 |
| 6,345,092 B1 | 2/2002 | Hoshi | |
| 6,493,444 B2 | 12/2002 | Williams | |
| 2002/0071543 A1 | 6/2002 | Williams | |

* cited by examiner

*Primary Examiner* — Quynh Nguyen

(57) ABSTRACT

A method is provided for reserving trunks on a trunk group for designated class of service calls. The trunks available for a denominated class of service is specified, and the trunks remaining are enumerated and designated as of no class and available for all calls. When the no class trunks are in use and a new call is a denominated class of service, it is allocated to a trunk and the trunks available is reduced accordingly. If the no class trunks are in use and a new call is not of a denominated class of service, the new call is allocated to a further trunk group. When a call is released and the number available is reduced below a specified number, the number of available trunks increases. If the number of trunks available is not reduced below a specified number, the released trunk is made available for all calls.

10 Claims, 4 Drawing Sheets

TRUNK SPARING

TECHNICAL FIELD

The invention is related to the field of communications, and in particular, to telecommunications and the reservation of trunks in a trunk group for calls with an elevated class of service.

TECHNICAL BACKGROUND

A telephone exchange switch allocates calls to an outgoing trunk group consisting of trunk lines to a different exchange switch where a call is to other than a local telephone. Some such calls may have a priority giving them a higher class of service (COS) which allows them to pre-empt calls with a lower class of service. Calls may be allocated to the trunk group regardless of the COS but typically calls such as emergency calls have a dedicated trunk line which ensures that they will be forwarded to the required destination without being routed through an excessive number of exchanges when trunk groups are busy. Clearly if too many trunk lines are reserved for various classes of service the general service will suffer, so the allocation of reserved trunks is an exercise in statistics.

U.S. Pat. No. 6,493,444 to L. Lloyd Williams (published as US 20020071543) and originally filed Mar. 16, 1999 relates to a Public Switched Telephone Network (PSTN) with common channel signaling to a call control node from each switching office, so that node can control the call routing in an efficient manner. This includes detecting calls which require an enhanced level of service, and routing these calls via reserved trunks. It also includes overflowing plain old telephone system (POTS) calls into the reserved trunks under overflow conditions, which tends to reduce or negate the reason for reserved trunks.

U.S. Pat. No. 6,345,092 to Rie Hoshi relates to trunks physically graded into reserved and non-reserved classes of service. At times when utilization is low the specification proposes using non-reserved trunks for all calls, though it may use both reserved and non-reserved without distinction, but when usage is high it places reserved calls onto reserved trunks. The specification also includes restricting all calls when reserved trunks are full, and having grades of reserved call restriction depending on the level of usage of reserved trunks. Because physical trunks are reserved the system must track the usage state of each line within the reserved lines to ensure that it is usable, and the individual allocation of each call to a line.

Tracking and allocating calls under such a system requires fairly high overheads in terms of marking particular lines as reserved and tracking their use and it would be preferable to provide a system where the overheads were reduced.

The present invention provides a solution to this and other problems which offers advantages over the prior art or which will at least provide the public with a useful choice.

All references, including any patents or patent applications cited in this specification are hereby incorporated by reference. It will be clearly understood that, although a number of prior art publications are referred to herein; this reference does not constitute an admission that any of these documents form part of the common general knowledge in the art in any country.

TECHNICAL SUMMARY

Generally described, a method is provided for reserving trunks on a first trunk group for calls of a designated class of service, wherein at least one class of service is denominated. The number of trunks available for a denominated class of service is specified, and the number of trunks remaining are enumerated and designated as of no class and available for all calls. When the trunks of no class are all in use and a new call is of a denominated class of service, then the new call is allocated to a trunk and the trunks available for that class of service is reduced by one. If the trunks of no class are all in use and a new call is not of a denominated class of service, then the new call is allocated to a further trunk group. Further, when a call is released and the number of trunks available to a class of service is reduced below a specified number, then the number of available trunks for that class of service increases. If the number of trunks available to a class of service is not reduced below a specified number and a call is released, then the released trunk is made available for all calls.

In another embodiment, a telecommunications switching system is provided for handling calls with differing classes of service requirements. The system comprises at least one telecommunications switching centre having multiple trunk groups. Each trunk group connects to a telecommunications switching centre and consists of a number of trunk lines. The system also comprises a trunk group reserver that specifies the number of trunk lines in a trunk group that should be reserved for each class of service. The sum of the number of trunk lines reserved for each class of service is less than the total number of trunks available in the trunk group. The system further comprises a trunk group allocator that allocates trunks in the trunk group to calls. If the unallocated trunks in a trunk group are greater than the total number of trunks in a trunk group reserved for differing classes of service, then the allocator will allocate a call to the trunk group. Otherwise, if the number of unallocated trunks is less than the total number of trunks reserved for the differing classes of service and the number of trunks allocated to a class of service is less than that reserved by the class of service, then the allocator will allocate the call to the trunk group. Otherwise, the call will be transferred to a different trunk group or refused.

Another embodiment describes an apparatus for configuring a telecommunications trunk group switch. The apparatus includes a programmable switch controller connected to a telecommunications trunk group switch, a parameter supplier supplying parameters to the programmable switch controller, and a program performed by the programmable switch controller. The program accepts parameters defining one or more classes of service for calls connected through the switch. The program also accepts parameters defining the maximum number of trunk group lines which may be occupied by each of the one or more classes of service resolving the number of trunk group lines which will not be allocated to any class of service. Finally, the program connects calls to the trunk group regardless of class of service up to the number of trunk group lines which are not allocated to any class of service thereafter connecting only calls of a class of service which have less than the maximum number of trunk group lines occupied.

DETAILED DESCRIPTION

A telephone exchange includes provision for switching a call from an incoming trunk group or line to an outgoing trunk group, which may itself be switched to a further trunk group or line. This is described with reference to FIG. 1 where designations show:

| | |
|---|---|
| 100 | End User/call originator |
| 101 | End User's Line |
| 102 | Originating Switch A |
| 103 | Trunk Group 1 to Switch B |
| 104 | Switch B |
| 105 | ISDN trunk to PABX |
| 106 | ISDN PABX |
| 107 | End User's line on PABX |
| 108 | End User/911 Operator |
| 109 | Over Flow Trunk Group Switch A to Switch C |
| 110 | Switch C |
| 111 | Trunk Group from Switch B for Switch C |

Figure 1:
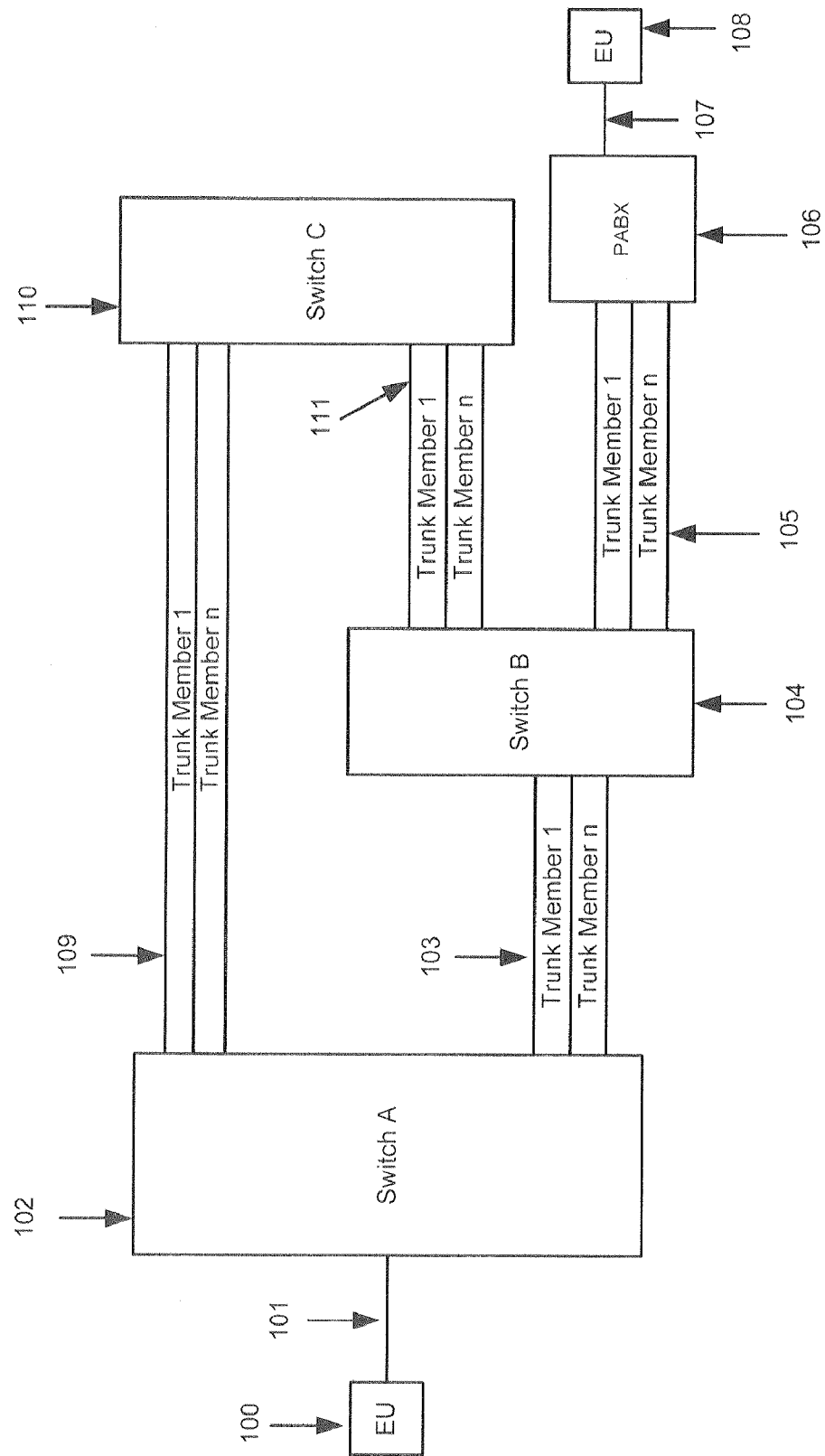
FIG. 1 illustrates a general architecture of the use of trunk groups among switches in a telephone exchange system.

FIG. 1 shows an end user 100 on a calling line 101 which terminates in a switch 102. Switch 102 has access to at least two groups of trunks 103 and 109, and each group of trunks connects to other switches 104 and 110. Switch 110 additionally has a trunk group connection to switch 104 via trunk group 111, and switch 104 also has a trunk group connection 105 to a Private Automatic Branch exchange (PABX) 106 which connects via line 107 to the destination user 108. Clearly there are at least two paths from originating user 100 to destination user 108, the first going via switch 102, trunk group 103, switch 104 and trunk group 105 while an alternative route exists via switch 102, trunk group 109, switch 110, trunk group 111, switch 104 and trunk group 105.

The shortest path is preferred, with the longer path being used only when all trunks in trunk group 103 are busy, trunk group 109 then acting as an overflow trunk for calls which cannot be accommodated on trunk group 103.

While the number of trunks between switches is calculated to provide adequate service for the expected traffic there will inevitably be times when all trunks are congested on a particular trunk group, while a longer route via alternative trunk groups may still provide an alternative route to the same destination. Some calls are regarded as important, for instance 911 emergency calls, and it is preferred that such calls are not subjected to the possibility that when a trunk group is busy the call may be diverted through many alternative trunk groups and inadvertently be directed to a group which has also become busy, resulting in a dropped call.

To avoid this possibility some lines in a trunk group can be set aside for calls which are classed as important and can only be used by such calls. Various levels of importance may be defined and calls may be allocated different lines depending on the importance of the call. For instance there may be classes of service for emergency calls, international calls, toll calls or toll calls from differing areas with limited service such as rural areas. Calls identified as potentially important may be defined as requiring a particular class of service (COS) and may be switched to the trunk lines which are reserved for that class of service, or to lines for a class of service which is less important.

Setting aside lines for the various classes of service entails maintaining a list of which lines are allocated to which COS in which trunk group and detecting when all of the lines available to a particular COS are busy in order to take an additional action.

The present embodiment proposes instead the reservation of a particular number of trunk lines for a particular COS, but the lines are not actually physically allocated, but rather are simply listed by the central control system for the switch involved. This is described with reference to FIG. 2 where designations show:

200—Number Trunk Group Members assigned

201—Sub-Trunk Group Class of Service (COS)

202—Number of Trunk Member available to A COS

Figure 2:
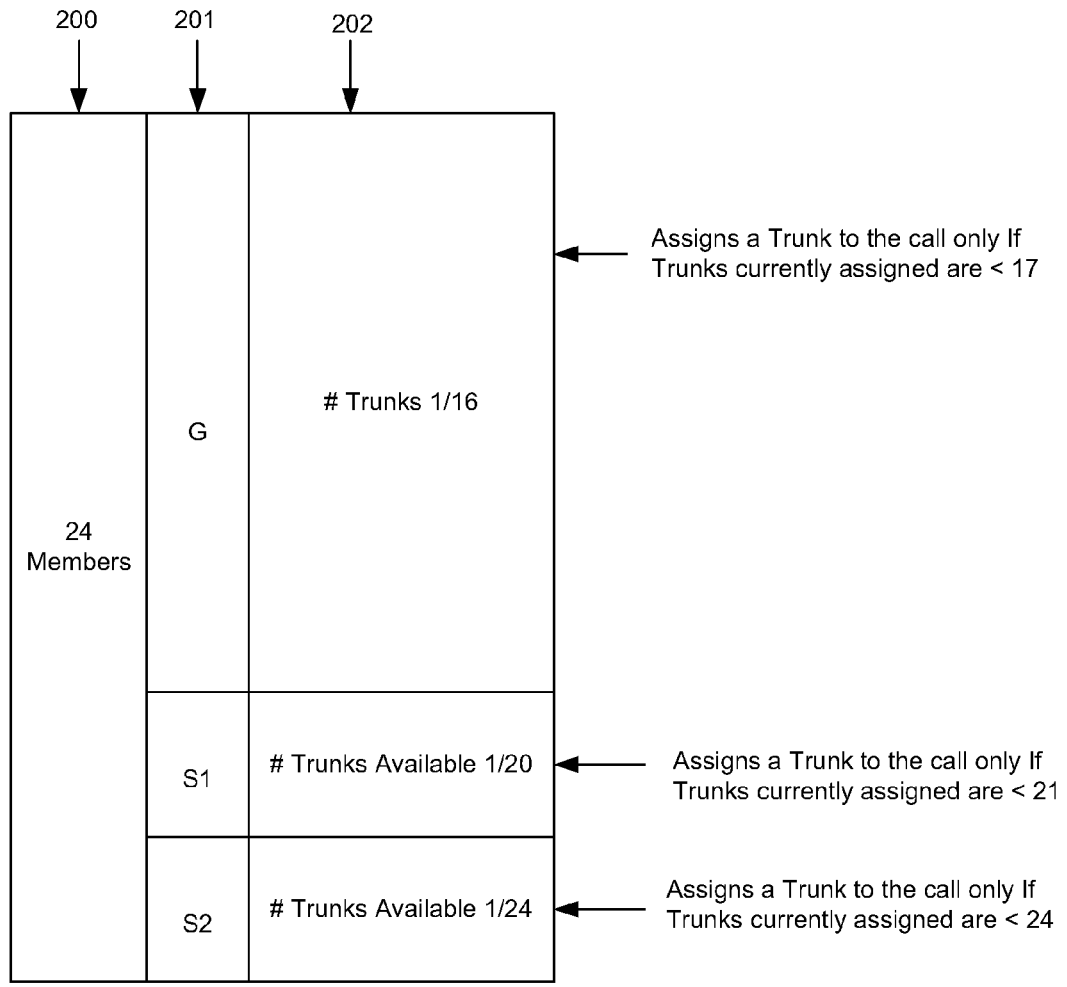
FIG. 2 illustrates the designation and allocation of calls to trunks.

Thus FIG. 2 shows a trunk group list with 24 members at 200 with trunks listed at 201 in classes S2 (the most important COS), S1 (a COS of lesser importance) and G (General—not designated with any COS [in the claims we have used the term "as of no class and available for all calls] and normally handling POTS (Plain Old Telephone Service) and 800 calls). At 202 it can be seen that 4 trunks are reserved for COS S2, four for COS S1 and the remaining 16 trunks are designated as COS G.

Figure 3:
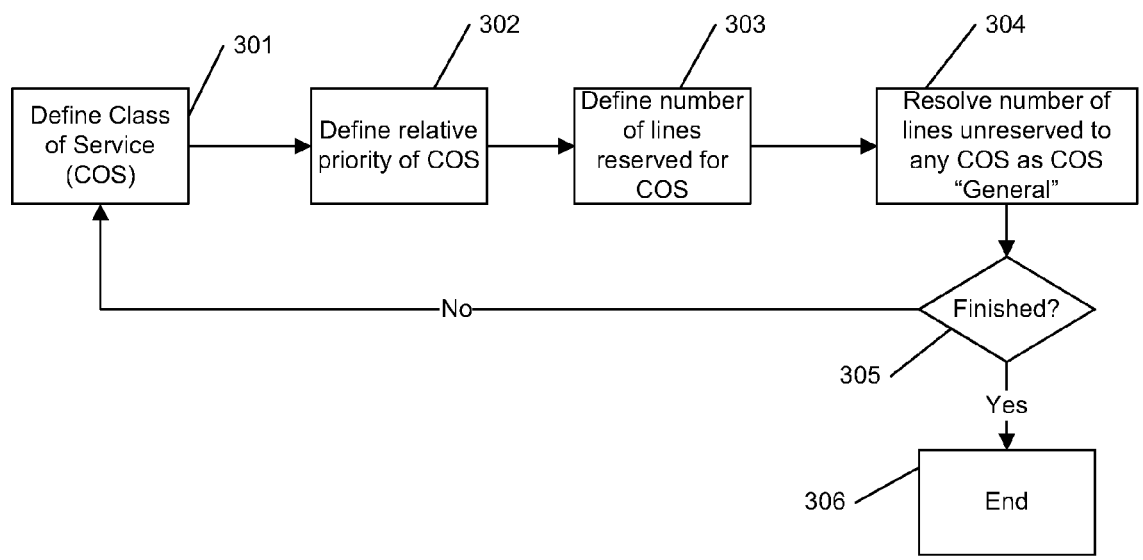
FIG. 3 illustrates the process flow for designating trunks to classes of service.

FIG. 3 shows the reservation process in which at 301 a COS is defined, for instance for emergency service calls. Other examples of a defined COS include rurally originating calls, mobile telephone originating calls or international toll calls. At 302 the priority of the COS is defined relative to other classes of service, for instance it may be desired to give one toll group within the Numbering Plan for North America (NPA) a higher class of service than another. At 303 the number of trunk lines on any particular switch to be reserved for the COS is entered, and at 304 the number of trunk lines remaining in the trunk group unreserved by any COS are denoted as "General". At 305 the entry of more classes of service are carried out until all are entered and the process is then terminated at 306.

When a trunk is allocated to a call the trunk group list may be marked to indicate that one trunk is busy. With no trunks allocated initially any incoming call, regardless of COS, can be allocated a trunk line, and the trunk group list marked as having that number of trunks allocated. Eventually as the trunk group congestion increases all trunks reserved for the COS G are allocated and busy, leaving eight free lines. From this point on only calls of a designated COS will be connected to the trunk group, other calls will be overflowed into a different trunk group or dropped.

As congestion further increases the number of busy trunk lines may exceed the limit set for the lowest COS (S1), in the present instance four lines, and calls of this COS will be overflowed or dropped, however four lines remain for the highest COS (S2) until these too are allocated as busy.

Typically a higher priority COS has the ability to use the number of trunks reserved for a lower COS in addition to its own, so in operation it would be expected that COS S2 would have access to a maximum of 8 trunks while COS S1 has access to only 4 trunks.

As calls end the trunk line is released and the trunk group list is marked to indicate that one more trunk line is available. When the number of available lines increases above the COS S2 reservation of four lines any additional trunk lines will be available to COS group S1. When the number of available lines increases above the eight line reservation of both S1 and S2 calls of any or no COS will be able to use the additional free lines.

While the trunk group described has twenty four trunk line members the number of members in a trunk group may vary between one and several hundred.

Figure 4:
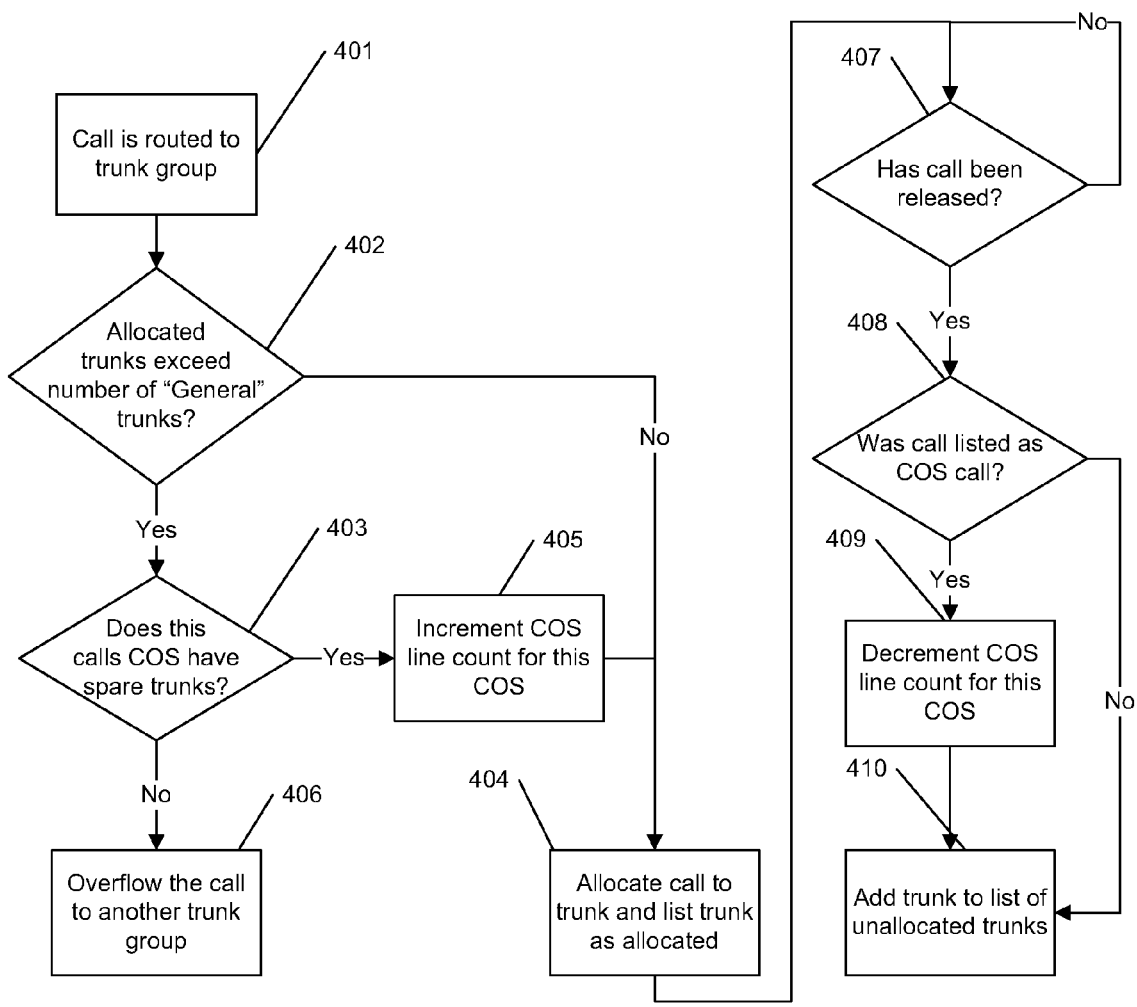
FIG. 4 illustrates the process flow.

FIG. 4 shows the manner in which a call is allocated to a trunk line in the inventive system. At 401 a call is routed to a trunk group and at 402 a check is made by the switch driving software on whether the number of trunks with calls allocated to them exceeds the specified number of "General" trunks. If it does not then the call is allocated to the trunk group on any free trunk line and the COS of the call is not noted. Where the number of trunk lines busy exceeds the specified number of "General" trunks a check is made at 403 as to the number of calls currently allocated with the same COS. If the number is less than the reserved number then the call is allocated to any free trunk line and the record of the number of lines allocated to that COS is increased by one at 405 and the call then allocated to any free trunk.

Should the number of trunk lines allocated to the COS equal the number of trunk lines reserved to the COS then the call is overflowed to another trunk group at 406.

When the call is released at 407 the call record is checked at 408 to see if this was recorded as a COS call, and if it was the count of the number of lines currently allocated to that COS is decremented by one at 409. The trunk line is then marked as unallocated at 410. If the call was not listed as a COS call then no COS list is updated.

While FIGS. 3 and 4 show one simplified possible process flow for allocating and releasing trunk lines for calls of various classes of service other process flows are likely, since in practice a number of parameters are passed to a trunk group switch control to mediate settings in the trunk group allocation process. These parameters may be such as least idle trunk selection, most idle trunk selection, or round robin trunk selection to control which line is allocated to the next call. To these is added a Trunk Sparing parameter to allow setting the number of trunk lines which are reserved for each COS. Other parameters may be provided to support the Trunk Sparing parameter relating to whether the COS is pre-emptive or sharing, whether an unconnectable call for a particular COS should be overflowed, busied or an error condition returned, or other desired characteristics.

Allocation may provide for COS groups which have the same priority and hence share the same reserved number of lines, but normally a COS with a higher priority can be considered to include access to all the lines of COS groups with a lower priority, that is, the higher priority COS group is a super class of the lower COS groups or alternatively the lower COS groups are sub classes of the higher priority COS groups.

The action taken when a call is unable to be allocated to a trunk group may vary dependent on the COS of the call and may be a choice of dropping the call, providing a "busy" tone or message, providing an alternative route via a different trunk group, routing the call to an alternative destination or some other action which is operationally expedient.

The process flow of FIGS. 3 and 4 is typically implemented by software controlling an exchange switch such as switch 102 within a telephone exchange which detects the origin, destination and class of service of each call. Such software constitutes a program for a programmable switch controller.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of reserving trunks on a first trunk group for calls comprising:
   denominating a plurality of classes of service wherein the classes have priorities allowing a class to act as a super class or subclass of a different class for trunk allocation purposes,
   specifying a number of trunks available for at least one of the denominated classes of service,
   enumerating a number of trunks remaining and designating them as of no class and available for all calls;
   wherein when the trunks of no class are all in use:
      and where a new call is of a denominated class of service;
         allocating the new call to a trunk of the denominated class of service and reducing the trunks available for that class of service by one,
      otherwise allocating the new call to a further trunk group;
   and when a call is released, and the number of trunks available to a class of service associated with the call is reduced below a specified number, increasing the number of available trunks for that class of service; otherwise making a trunk associated with the released call available for all calls.

2. A method as claimed in claim 1 comprising prioritizing a class of service to allow the class of service to make use of trunks reserved for one or more different classes of service in addition to those specified for the class of service.

3. A method as claimed in claim 1 comprising providing to a trunk group switch in a telephone exchange parameters defining at least one class of service for the trunk group switch, a priority level of that class, and a number of trunks to be reserved for that class.

4. A method as claimed in claim 1 comprising providing for classes of service including emergency calls, toll calls, international calls.

5. A method as claimed in claim 1 comprising providing for differing classes of service for toll calls from differing areas.

6. A telecommunications switching system handling calls with differing classes of service requirements and comprising at least one telecommunications switching centre having multiple trunk groups, each trunk group connecting to a telecommunications switching centre, each trunk group consisting of a number of trunk lines, a trunk group reserver specifying a number of trunk lines in a trunk group which should be reserved for each class of service, the number of reserved trunk lines being less than a total number of trunks available in the trunk group, and the trunk group reserver providing priorities for classes of service allowing a class to act as a super class or subclass of a different class for trunk allocation purposes; a trunk group allocator allocating trunks in a trunk group to calls wherein:
   if a number of trunks in a trunk group not yet allocated is greater than a total number of trunks in a trunk group reserved for differing classes of service the allocator will allocate a call to the trunk group,
   or if the number of trunks not yet allocated is less than the total number of trunks reserved for the differing classes of service and the number of trunks allocated to a class of service is less than that reserved by the class of service the allocator will allocate the call to the trunk group;
   otherwise the call will be transferred to a different trunk group or refused.

7. A telecommunications system as claimed in claim 6 wherein when a trunk group call is released the call allocator is advised of the release and a class of service of the released call.

8. An apparatus for configuring a telecommunications trunk group switch comprising:

a programmable switch controller connected to a telecommunications trunk group switch;

a parameter supplier supplying parameters to the programmable switch controller;

a program, performed by the programmable switch controller, said program:

accepting parameters defining one or more classes of service for calls connected through the telecommunications trunk group switch, accepting parameters defining a maximum number of trunk group lines which may be occupied by each of the one or more classes of service resolving a number of trunk group lines which will not be allocated to any class of service, connecting calls to the telecommunications trunk group switch regardless of class of service up to the number of trunk group lines which are not allocated to any class of service thereafter connecting only calls of a class of service which has less than the maximum number of trunk group lines occupied.

9. An apparatus as claimed in claim 8 wherein the program also accepts parameters defining processing of calls for classes of service when the call cannot be connected.

10. An apparatus as claimed in claim 9 wherein the parameters for calls unable to be allocated to a trunk line define options for overflow to a different trunk group switch, returning a call busy indication or returning an error condition.

* * * * *